Patented Oct. 14, 1930

1,778,381

UNITED STATES PATENT OFFICE

KAREL CUKER, OF TAVIKOVICE, CZECHOSLOVAKIA

PROCESS FOR INCREASING THE POTASSIUM SALT CONTENT OF DISTILLER'S WASTE

No Drawing. Application filed March 25, 1927, Serial No. 178,514, and in Czechoslovakia March 30, 1926.

My invention relates to a process for obtaining concentrated solutions of potash from the fermented residues of alcohol.

In carrying out my process, the fermented residues of beets or molasses, after distilling off the spirit and, when necessary, neutralization, are freed of all solid components by the centrifuge. The centrifuge is to be constructed for such a rotation speed that the suspension, consisting chiefly of fermentation cells, condensed nitrogenous and other components, is turned by centrifugal force into a solid, at least semi-solid consistency.

The last mentioned materials are of a high nutritive value and may be dried either unmixed or combined with bran, linseed-cakes and also other fodder and thus a fodder of a high nutritive value is obtained.

The liquid left after the mass has gone through the centrifuge, the ash contents of which is chiefly potash, may be used instead of water for a new diluting of the molasses destined for fermenting and this may be repeated as many times as feasible until the increasing concentration of salts injuriously affects the fermentation.

When using beet, the fermented liquid mentioned before may be used analogously instead of diffusional water, of course, only in batteries working continuously without waste-water.

In this way the potash salts in the distiller's wash are concentrated and allow an economical recovery thereof in the usual way, e. g., into potash, etc.

It will be understood that where in the claim I refer to centrifuging, I include by such term any other process, such as filter-pressing, whereby the suspended matter may be separated in solid or at least semi-solid or pasty condition.

I claim:

A process for the treatment of distiller's washes for obtaining concentrated potassium solutions, consisting in separating out the suspended matter from the wash in the form of a mass of solid or semi-solid consistency by centrifuging, and preparing new mash with substantially all of the so purified liquor, the wash resulting from the treatment of the new mash being in turn centrifuged and the clean separated liquor used for preparing a further new mash, the cycle being repeated until the concentration of the salts in the liquor is so high as to interfere with the normal fermentation process, the concentration of potassium salts being thereby increased and the cost of their recovery reduced.

In testimony whereof I affix my signature.

KAREL CUKER.